United States Patent
Levin et al.

(10) Patent No.: US 12,223,337 B2
(45) Date of Patent: *Feb. 11, 2025

(54) CLOUD NATIVE VIRTUAL MACHINE RUNTIME PROTECTION

(71) Applicant: Palo Alto Networks, Inc., Santa Clara, CA (US)

(72) Inventors: Liron Levin, Kefar Sava (IL); John Morello, Baton Rouge, LA (US); Dima Stopel, Herzliya (IL); Michael Velbaum, Herzliya (IL); Itay Abramowsky, Herzliya (IL); Isaac Schnitzer, Ra'anana (IL)

(73) Assignee: Palo Alto Networks, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/464,799

(22) Filed: Sep. 11, 2023

(65) Prior Publication Data

US 2023/0418637 A1    Dec. 28, 2023

Related U.S. Application Data

(63) Continuation of application No. 17/539,658, filed on Dec. 1, 2021, now Pat. No. 11,797,322, which is a
(Continued)

(51) Int. Cl.
*H04L 9/40*       (2022.01)
*G06F 9/445*      (2018.01)
(Continued)

(52) U.S. Cl.
CPC ......... *G06F 9/455* (2013.01); *G06F 9/44505* (2013.01); *G06F 9/45558* (2013.01);
(Continued)

(58) Field of Classification Search
CPC ...... G06F 9/455; G06F 16/2379; G06F 21/51; G06F 21/53
See application file for complete search history.

(56) References Cited

U.S. PATENT DOCUMENTS 8,589,403 B2    11/2013   Marquardt et al.
8,769,684 B2    7/2014    Stolfo et al.
(Continued)

*Primary Examiner* — Viral S Lakhia
(74) *Attorney, Agent, or Firm* — Gilliam IP PLLC

(57) ABSTRACT

A system and method for cloud native virtual machine (VM) runtime protection. The method includes creating a normal behavior model for a cloud native VM by training a machine learning model using a training data set including training activities performed by the cloud native VM, the cloud native VM being configured to provide at least one service, wherein the normal behavior model defines at least one capability of each service based on a set of capabilities for respective known services stored within a library of service-to-capability mappings, wherein each capability of a service indicates a plurality of discrete behaviors required by the service; and monitoring an execution of the cloud native VM to detect a deviation from the normal behavior model, wherein the deviation is caused by at least one abnormal behavior of one of the services that is not among the discrete behaviors defined in capabilities for the service.

20 Claims, 2 Drawing Sheets

Related U.S. Application Data continuation of application No. 16/108,824, filed on Aug. 22, 2018, now Pat. No. 11,366,680.

(60) Provisional application No. 62/700,586, filed on Jul. 19, 2018.

(51) Int. Cl.

| | | |
|---|---|---|
| *G06F 9/455* | (2018.01) | |
| *G06F 16/23* | (2019.01) | |
| *G06F 18/214* | (2023.01) | |
| *G06F 21/51* | (2013.01) | |
| *G06F 21/53* | (2013.01) | |
| *G06F 21/54* | (2013.01) | |
| *G06N 20/00* | (2019.01) | |

(52) U.S. Cl.
CPC ........ *G06F 16/2379* (2019.01); *G06F 18/214* (2023.01); *G06F 21/51* (2013.01); *G06F 21/53* (2013.01); *G06F 21/54* (2013.01); *G06N 20/00* (2019.01); *H04L 63/20* (2013.01); *G06F 2009/45583* (2013.01); *G06F 2009/45587* (2013.01); *G06F 2009/45591* (2013.01); *G06F 2009/45595* (2013.01)

(56) References Cited

U.S. PATENT DOCUMENTS

| | | |
|---|---|---|
| 8,935,793 B2 | 1/2015 | Weinstein |
| 9,165,142 B1 | 10/2015 | Sanders et al. |
| 9,294,501 B2 | 3/2016 | Mesdaq et al. |
| 9,610,893 B2 | 4/2017 | Lopez-Hinojosa et al. |
| 9,661,018 B1 * | 5/2017 | Aziz .................. H04L 63/1416 |
| 9,747,440 B2 * | 8/2017 | Gupta ................. G06F 11/3013 |
| 9,794,275 B1 | 10/2017 | Benameur et al. |
| 9,804,909 B1 | 10/2017 | Fang et al. |
| 9,843,596 B1 | 12/2017 | Averbuch et al. |
| 10,042,697 B2 | 8/2018 | Ahad |
| 10,083,071 B2 | 9/2018 | Sonalker et al. |
| 10,110,600 B1 | 10/2018 | Smica |
| 10,210,329 B1 | 2/2019 | Malik et al. |
| 10,268,493 B2 * | 4/2019 | Thomas .................. H04L 67/54 |
| 10,270,788 B2 | 4/2019 | Faigon et al. |
| 10,328,855 B2 | 6/2019 | Lopez-Hinojosa et al. |
| 10,397,255 B1 | 8/2019 | Bhalotra et al. |
| 10,417,413 B2 | 9/2019 | Sikder |
| 10,474,934 B1 | 11/2019 | Cosic |
| 10,572,375 B1 | 2/2020 | Wagner |
| 10,621,019 B1 | 4/2020 | Faulhaber, Jr. et al. |
| 10,652,274 B2 * | 5/2020 | Barak .................. H04L 63/145 |
| 10,713,543 B1 | 7/2020 | Skuin et al. |
| 10,776,487 B2 | 9/2020 | Tora et al. |
| 10,795,715 B2 * | 10/2020 | Ahmad ................. G06F 11/302 |
| 10,831,519 B2 * | 11/2020 | Faulhaber, Jr. ......... G06N 20/00 |
| 10,911,474 B2 * | 2/2021 | Chandana ........... H04L 63/1441 |
| 10,951,648 B2 | 3/2021 | Doron et al. |
| 10,956,833 B1 * | 3/2021 | Yamane .................... G06F 8/77 |
| 10,997,009 B2 | 5/2021 | Poghosyan et al. |
| 11,238,158 B2 * | 2/2022 | Vijayvargiya ........ G06F 21/566 |
| 11,301,759 B2 * | 4/2022 | Lin .......................... G06F 40/30 |
| 11,403,551 B2 * | 8/2022 | Lavid Ben Lulu ...... G07C 3/00 |
| 11,461,469 B2 * | 10/2022 | Wolfin .................. G06F 11/302 |
| 11,522,887 B2 * | 12/2022 | Dunn .................. G06F 3/04842 |
| 11,556,633 B2 * | 1/2023 | Mukherjee .............. G06F 21/53 |
| 11,689,576 B2 * | 6/2023 | Levin .................. H04L 41/0836 726/5 |
| 11,846,980 B2 * | 12/2023 | Pendyala ............ G06F 21/6218 |
| 2016/0099963 A1 | 4/2016 | Mahaffey et al. |
| 2016/0350173 A1 | 12/2016 | Ahad |
| 2016/0359695 A1 | 12/2016 | Yadav et al. |
| 2017/0214702 A1 | 7/2017 | Moscovici et al. |
| 2017/0220651 A1 | 8/2017 | Mathew et al. |
| 2017/0353477 A1 | 12/2017 | Faigon et al. |
| 2018/0060581 A1 | 3/2018 | El-Moussa et al. |
| 2018/0060582 A1 | 3/2018 | El-Moussa et al. |
| 2018/0060744 A1 | 3/2018 | Achin et al. |
| 2018/0083833 A1 | 3/2018 | Zoll et al. |
| 2018/0091531 A1 | 3/2018 | El-Moussa et al. |
| 2018/0130006 A1 * | 5/2018 | Adjaoute ............... G06N 3/006 |
| 2018/0196732 A1 | 7/2018 | Dolev et al. |
| 2018/0285563 A1 | 10/2018 | Browne et al. |
| 2018/0288091 A1 | 10/2018 | Doron et al. |
| 2018/0309770 A1 | 10/2018 | Han et al. |
| 2018/0351838 A1 | 12/2018 | Lui et al. |
| 2019/0044963 A1 | 2/2019 | Rajasekharan et al. |
| 2019/0068627 A1 | 2/2019 | Thampy et al. |
| 2019/0121979 A1 | 4/2019 | Chari et al. |
| 2019/0179678 A1 | 6/2019 | Banerjee |
| 2019/0286826 A1 | 9/2019 | Bargury et al. |
| 2019/0294477 A1 | 9/2019 | Koppes et al. |
| 2019/0294960 A1 | 9/2019 | Niemi |
| 2019/0377625 A1 | 12/2019 | Chintalapati et al. |
| 2020/0167671 A1 * | 5/2020 | Okada .................... G06N 20/00 |
| 2020/0183769 A1 | 6/2020 | Poghosyan et al. |

* cited by examiner

CLOUD NATIVE VIRTUAL MACHINE RUNTIME PROTECTION

CROSS-REFERENCE TO RELATED APPLICATIONS

The application is a continuation of Ser. No. 17/539,658, filed on Dec. 1, 2021, now allowed, which in a continuation of Ser. No. 16/108,824 filed on Aug. 22, 2018, now U.S. Pat. No. 11,366,680, which claims the benefit of U.S. Provisional Application No. 62/700,586 filed on Jul. 19, 2018. The contents of the above-referenced applications are hereby incorporated by reference.

TECHNICAL FIELD

The present disclosure relates generally to cloud native technologies, and more specifically to cloud native virtual machines.

BACKGROUND

In modern cloud native environments, virtual machines are typically deployed through automation and operate as stateless entities. The Cloud Native Computing Foundation defines cloud native technologies as involving building and running scalable applications in modern, dynamic environments such as public, private, and hybrid clouds. Example cloud native technologies include containers, service meshes, microservices, immutable infrastructure, and declarative application programming interface (API).

Cloud native virtual machines (VMs) are designed to run containers directly or to run stateless workloads in support of containerized applications. Cloud native VMs are dynamically deployed, orchestrated with minimal human involvement, and focused on hosting and running microservices. Such cloud native VMs may be targets for attackers seeking to disrupt businesses or steal data.

Existing runtime protection tools assume high degrees of manual configuration and supervision, and are typically focused on protecting a specific application on a given cloud native VM rather than protecting the entire cloud native VM. For example, some existing solutions require an administrator to define specific lists of what processes are allowed to run, what file paths are allowed to be written to, and what ports can be opened. Often, these details are not understood comprehensively by users which often leads to 'false positives' or overly permissive policies. Additionally, this manual configuration is directly contradictory to a model that assumes centralized deployment and management via automation and orchestration tooling. These existing solutions are both less effective at protecting cloud native VMs as well as incompatible with the deployment and management style prevalently used to operate them.

Additionally, existing solutions for providing runtime security defense utilize a server or other external system that interacts with an application. Although runtime security defense may be integrated within the application itself, such integration requires manual modification of the application code by a programmer. This is inconvenient, as the application owner must either allow access to the code by the service provider or hire a programmer to perform the integration. Also, the manual integration is subject to human error that may cause bugs or other issues with the integrated code.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for cloud native virtual machine (VM) runtime protection. The method comprises: creating a normal behavior model for a cloud native VM by training a machine learning model using a training data set including a plurality of training activities performed by the cloud native VM, the cloud native VM being configured to provide at least one service, wherein the normal behavior model defines at least one capability of each of the at least one service based on a set of capabilities for respective known services stored within a library of service-to-capability mappings, wherein each capability of a service indicates a plurality of discrete behaviors required by the service; and monitoring an execution of the cloud native VM to detect a deviation from the normal behavior model, wherein the deviation is caused by at least one abnormal behavior of one of the at least one service that is not among the discrete behaviors defined in the at least one capability for the service.

Certain embodiments disclosed herein also include a non-transitory computer readable medium having stored thereon causing a processing circuitry to execute a process, the process comprising: creating a normal behavior model for a cloud native VM by training a machine learning model using a training data set including a plurality of training activities performed by the cloud native VM, the cloud native VM being configured to provide at least one service, wherein the normal behavior model defines at least one capability of each of the at least one service based on a set of capabilities for respective known services stored within a library of service-to-capability mappings, wherein each capability of a service indicates a plurality of discrete behaviors required by the service; and monitoring an execution of the cloud native VM to detect a deviation from the normal behavior model, wherein the deviation is caused by at least one abnormal behavior of one of the at least one service that is not among the discrete behaviors defined in the at least one capability for the service.

Certain embodiments disclosed herein also include a system for cloud native virtual machine (VM) runtime protection. The system comprises: a processing circuitry; and a memory, the memory containing instructions that, when executed by the processing circuitry, configure the system to: create a normal behavior model for a cloud native VM by training a machine learning model using a training data set including a plurality of training activities performed by the cloud native VM, the cloud native VM being configured to provide at least one service, wherein the normal behavior model defines at least one capability of each of the at least one service based on a set of capabilities for respective known services stored within a library of service-to-capability mappings, wherein each capability of a service indicates a plurality of discrete behaviors required by the service; and monitor an execution of the cloud native VM to detect a deviation from the normal behavior model, wherein the deviation is caused by at least one abnormal behavior of one of the at least one service that is not among the discrete behaviors defined in the at least one capability for the service.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
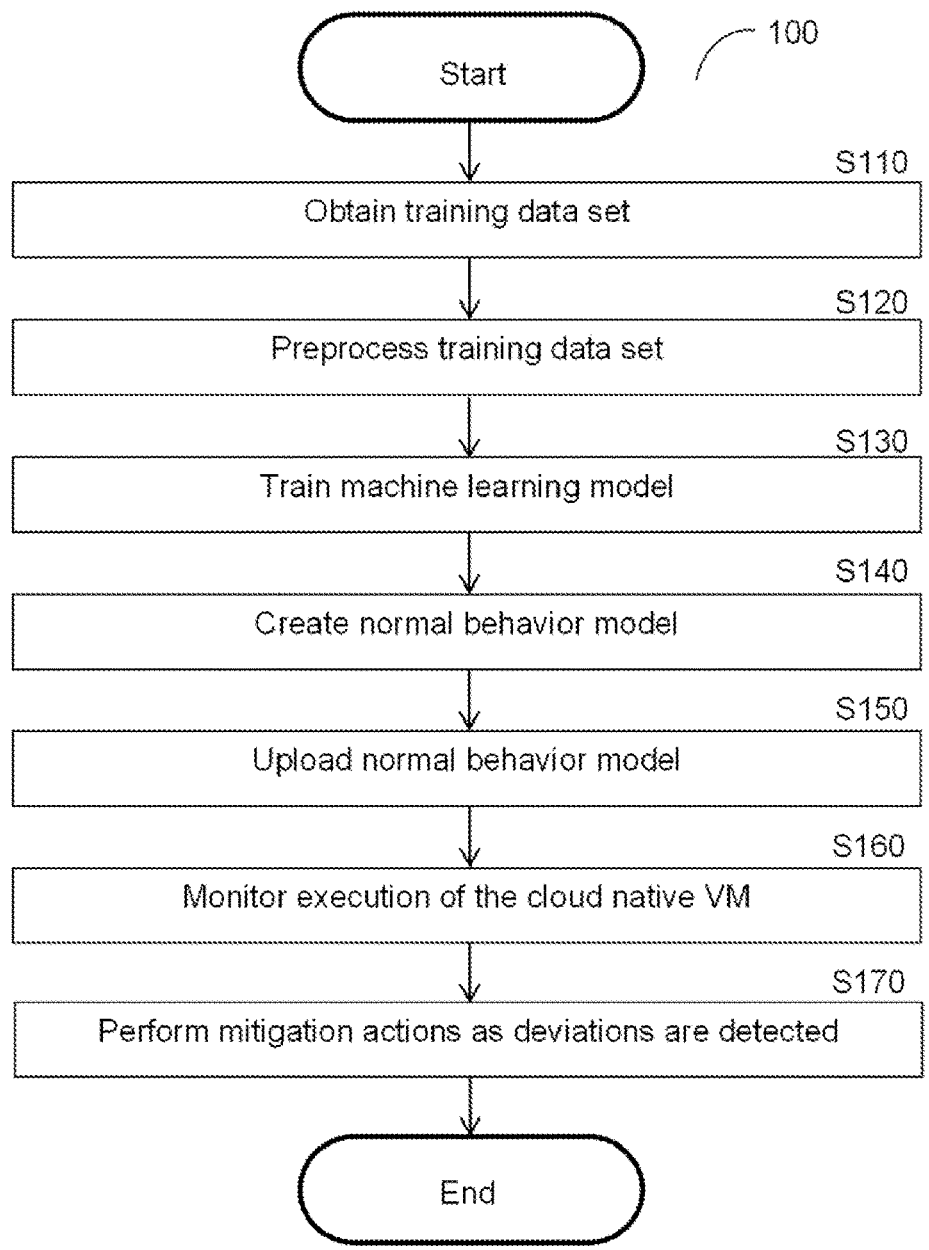
FIG. 1 is a flowchart illustrating a method for cloud native virtual machine (VM) runtime protection according to an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for cloud native virtual machine (VM) runtime protection. A cloud native VM is configured to provide one or more services. A normal behavior model is created for the cloud native VM by training a machine learning model using a training data set including at least training activities that each service of the cloud native VM performed. The normal behavior model defines capabilities of each service. Each capability indicates a plurality of discrete behaviors required by the service during normal operation. To this end, a capability is an abstraction of multiple discrete behaviors that includes deeper correlations between the discrete behaviors. This abstraction allows for providing higher level capability descriptors using low level knowledge of behaviors. A deviation from the normal behavior model may be detected when behaviors of a service of the cloud native VM do not match the capabilities for the service indicated in the normal behavior model.

When the normal behavior model has been created, execution of the cloud native VM may be monitored to detect deviations from the normal behavior model in the form of one or more abnormal behaviors. When an abnormal behavior is detected, one or more mitigation actions may be performed. The mitigation actions may include, for example, blocking activities associated with one or more of the capabilities, terminating execution of the cloud native VM, terminating execution of one or more services of the cloud native VM, generating alerts or notifications, and the like. As a non-limiting example, when the abnormal behavior deviates from normal behavior with respect to one of the capabilities, all behavior associated with the capability may be blocked.

The training set may further include training services and corresponding training capabilities. The training services and capabilities may be indicated in a library of service-to-capability mappings providing predetermined capability definitions for one or more of the services. Such predetermined capability definitions may provide baseline capabilities of each service. For example, the training data set used to train the machine learning model may include training capabilities and associated training services.

The normal behavior model may be enhanced using explicit behavioral rules indicating explicitly allowed or denied behaviors. These explicit rules can be dynamically combined with the models at runtime to create a fully customizable resultant policy, while only requiring explicit statements of those components that differ from the learned model. Such tuning can also be used as a signal by a cloud service to indicate models that may require additional refinement. For example, normal behavior models requiring at least a threshold number of explicit behavioral policies may be identified as requiring additional refinement, and may be subject to additional training of their respective machine learning models. Such normal behavior models requiring refinement may be removed from the cloud service to reduce or prevent sharing of flawed normal behavior models.

Additionally, normal behavior models may be shared to allow for compiling known capabilities. To this end, in an example implementation, normal behavior models may be uploaded to a cloud service and either used directly by other users or curated before dissemination. Thus, the models may be manually curated for common distribution-specific services, common cloud services, or common applications (e.g., a DNS service, Google® user manager, Kubernetes, etc.). Thus, in some implementations, pre-defined models may be utilized instead of creating new models when common services or applications are present. To this end, when a new cloud native VM or instance of a cloud native VM is run, it may be determined whether a common service or application is present and, if not, a new normal behavior model may be created.

As noted above, a capability is composed of multiple discrete behaviors. Such discrete behaviors may include, for example, what binaries or other processes run (e.g., "yum install"), input arguments for such processes (e.g., "-q" for yum), what file paths are accessed by the service. The discrete behaviors are abstracted into a higher-level summary of a set of related behaviors that are typically required by a given service. These capabilities also include deeper correlations between discrete behaviors, such as a service executing a process with specific parameters that can only listen on a specific socket and only creates non-executable files, thus further tightening the definitions in the capability and increasing the precision and accuracy of normal behavior models.

Rather than requiring users to manually define specific lists of allowed process and file paths, the disclosed embodiments include applying machine learning to create a model of the capabilities of every service within a cloud native VM. This modeling uses observed, behavioral modeling of cloud native VM behaviors, and may also use static analysis of service configurations. The models may also allow for a predictive, look-ahead capability based on centrally disseminated knowledge shared across installations through sharing of models.

For example, in an existing runtime defense application, if an application creates user accounts, the administrator would need to configure the runtime protection tool to specifically allow a binary like /usr/sbin/useradd and to modify a file like /etc/passwd. If the application also deletes user accounts, they would need to also allow /usr/sbin/userdel and to modify user accounts /usr/sbin/usermod, all of which are highly related activities. If a service is going to create user accounts, it will almost certainly need to be able to delete and modify them as well so requiring administrators to manually define every single discrete process and file used is both inefficient and error prone.

The learned capabilities may be defined with respect to hierarchical relationships. Below are some example hierarchical relationships:

Cloud Native VM
  Service-A
    Capability: User management
      Allowed processes: useradd, usermod, userdel
      Allowed file paths: /etc/passwd
    Capability: DNS configuration
      Allowed file paths: /etc/hosts, /etc/resolv.conf
  Service-B
    Capability: Software installation
      Allowed processes: yum
      Allowed arguments: upgrade, install In an example implementation using model-based capabilities according to the disclosed embodiments, once the service is determined to be creating user accounts, it may be assigned the user management capability, which is a centrally curated configuration describing all the typical discrete runtime allowances needed. This approach removes the administrative burden of needing to define rules completely manually and can be predictive by leveraging observed behaviors from other installations or environments to infer the typical normal behaviors, even if that access has not yet been attempted on the given cloud native VM in question.

The disclosed embodiments also address a challenge for using machine learning to create runtime models in interactive systems like cloud native VMs. Specifically, in an embodiment, interactive sessions are differentiated from non-interactive sessions. The non-interactive services may be, for example, background services. For example, a user logging on via a terminal may be differentiated from background services that do not involve interactions with the user. This differentiation allows for reducing false positives because it filters out inherently unpredictable user activity from predictable background service activity and allows enforcement to focus specifically on anomalous background behaviors. Further, this awareness of interactive session behaviors allows for classification of normal user activity flows and automatic identification of anomalous flows. For example, the model can identify that on a given host, interactive user sessions are never used for creating users. Thus, an alert may be automatically generated when an unexpected creation of a user account occurs during an interactive session. As another example, the model can identify that non-root users may not elevate privileges such that an alert may be triggered when a non-root user attempts to elevate privileges.

Thus, the disclosed embodiments include the machine learning of normal behaviors, the differentiation of interactive versus background service activities, the abstraction of behaviors from low level knowledge of binaries and file paths into higher level capability descriptors, the centralized curation of a library of common system services, and the sharing of these models across installations. The disclosed embodiments allow for providing the various capabilities described herein to hosts designed to run single applications which do not utilize software containers.

FIG. 1 is an example flowchart 100 illustrating a method for cloud native virtual machine (VM) runtime protection according to an embodiment. In an embodiment, the method is performed by the virtual machine runtime protector 200, FIG. 2. The method allows for creating a normal behavior model representing normal behaviors of a cloud native VM configured to provide one or more services and, more specifically, capabilities of each service. Each capability includes multiple discrete behaviors required by the service and correlations among such discrete behaviors.

At S110, a training data set is obtained. The training data set may be received or may be collected based on monitoring of activities by the cloud native VM. The training set includes training activities performed by services of the cloud native VM. The training activities may include, for example, processes (e.g., binaries) run by a service, file paths used by the service, and the like. In some implementations, the training data set may further include training services and corresponding training capabilities. Each training service may have one or more corresponding training capability. The training services and capabilities may be predetermined capabilities for each service, and may be provided based on user inputs, based on one or more shared normal behavior models, or both. The training service and corresponding training capabilities may be indicated in a library of service-to-capability mappings defining services and known capabilities of each service. The library may be populated at least in part based on previously created known behavior models.

At optional S120, the training data set may be preprocessed prior to use in machine learning. The preprocessing may include normalizing the training data set. In an embodiment, the preprocessing includes differentiating between interactive and non-interactive background activities. To this end, S120 may include identifying each training activity as an interactive activity or as a background activity. Differentiating between interactive and background activities allows for creating more accurate normal behavior models by excluding interactive activities that may be unpredictable and, therefore, non-indicative of abnormal behavior by the cloud native VM. Alternatively or collectively, the differentiation may allow for classifying the training activities as user activities or cloud native VM activities, thereby allowing for separately classifying user and cloud native VM behaviors.

At S130, a machine learning model is trained using the training data set.

At S140, a normal behavior model is created based on the machine learning model. In an optional embodiment, S140 may include enhancing the machine learning model using one or more behavioral rules, a library of service to capability mappings, or both. The behavioral rules may define explicitly allowed or denied behaviors for the service such that deviations from the normal behavior model may include behaviors that are not normal pursuant to the machine learning model or explicitly allowed as well as behaviors that are explicitly denied.

At optional S150, the normal behavior model may be uploaded to, for example, a cloud service. The uploaded normal behavior model may be accessible to other systems accessing the cloud service to allow for sharing of normal behavior models, either directly or after curation.

At S160, execution of the cloud native VM is monitored with respect to the normal behavior model.

At S170, mitigation actions are performed when abnormalities are detected based on the monitored execution and the normal behavior model. The mitigation actions may include, for example, terminating execution of the cloud native VM, terminating execution of one or more services of the cloud native VM, generating alerts or notifications, and the like.

Figure 2:
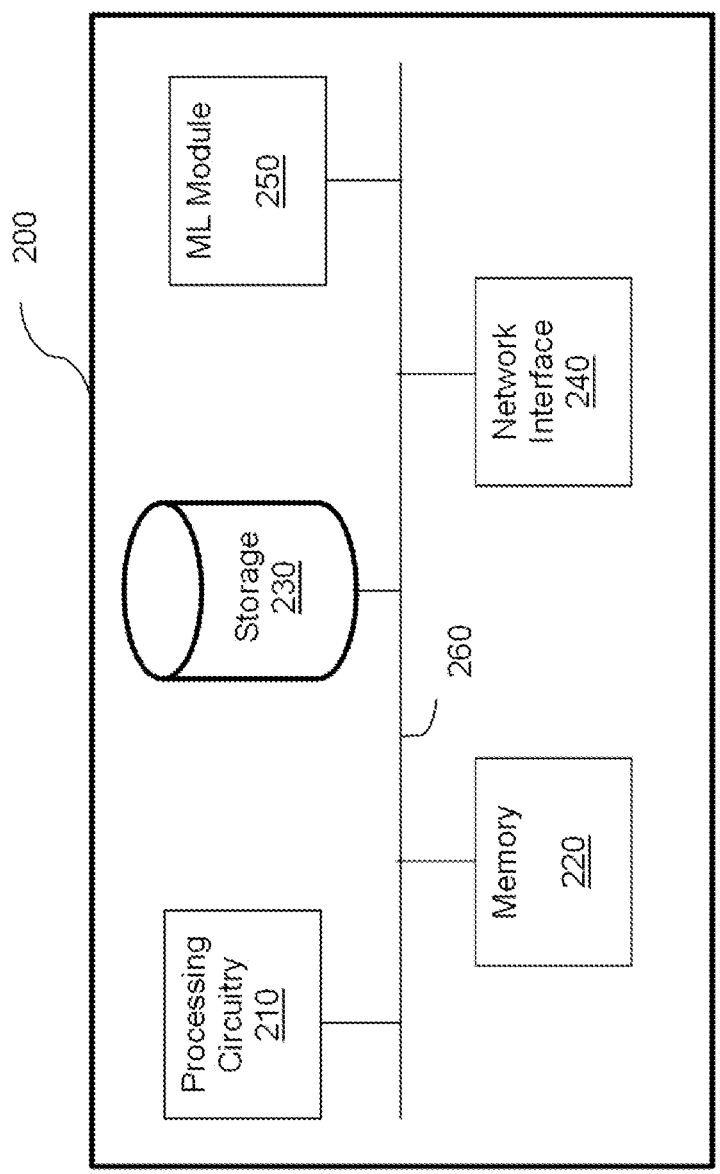
FIG. 2 is a schematic diagram of a cloud native virtual machine (CNVM) runtime protector according to an embodiment.

FIG. 2 is an example schematic diagram of a cloud native virtual machine (CNVM) runtime protector 200 according to an embodiment. The CNVM runtime protector 200 includes a processing circuitry 210 coupled to a memory 220, a storage 230, a network interface 240, and a machine learning (ML) module 250. In another embodiment, the components of the CNVM runtime protector 200 may be communicatively connected via a bus 260.

The processing circuitry 210 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), general-purpose microprocessors, microcontrollers, digital signal processors (DSPs), and the like, or any other hardware logic components that can perform calculations or other manipulations of information.

The memory 220 may be volatile (e.g., RAM, etc.), non-volatile (e.g., ROM, flash memory, etc.), or a combination thereof. In one configuration, computer readable instructions to implement one or more embodiments disclosed herein may be stored in the storage 230.

In another embodiment, the memory 220 is configured to store software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing circuitry 210 to perform the various processes described herein. Specifically, the instructions, when executed, cause the processing circuitry 210 to perform an on-demand authorization of access to protected resources, as discussed hereinabove.

The storage 230 may be magnetic storage, optical storage, and the like, and may be realized, for example, as flash memory or other memory technology, CD-ROM, Digital Versatile Disks (DVDs), or any other medium which can be used to store the desired information.

The ML module 250 is configured to train a machine learning model based on a training dataset. The machine learning model defines a baseline normal behavior of a cloud native VM and, in particular, capabilities indicating required behaviors of each service provided by the VM.

The network interface 240 allows the CNVM runtime protector 200 to communicate for the purpose of, for example, receiving training data sets, uploading normal behavior models to cloud services, and the like. Additionally, the network interface 240 may be utilized to send alerts indicating deviations from normal behaviors with respect to capabilities to external systems configured to perform mitigation actions with respect to the abnormally behaving cloud native VM.

It should be understood that the embodiments described herein are not limited to the specific architecture illustrated in FIG. 2, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

The invention claimed is:

1. A method comprising:
   training a machine learning model to detect normal behavior of one or more services running on a cloud native virtual machine (VM), wherein the machine learning model is trained to detect normal behavior on training data comprising a plurality of discrete behaviors of the one or more services and indications of whether each of the plurality of discrete behaviors corresponds to normal or abnormal behavior;

defining capabilities that indicate at least one of allowed behaviors and denied behaviors for each of the one or more services based, at least in part, on behaviors for the one or more services that the trained machine learning model has detected as normal or abnormal;

generating a normal behavior model according to the defined capabilities and the trained machine learning model; and detecting a behavior at the cloud native VM that deviates from the normal behavior model, wherein detecting a behavior that deviates from the normal behavior model comprises at least one of, detecting the behavior as an abnormal behavior with the trained machine learning model, detecting the behavior as not corresponding to an allowed behavior for a defined capability, and detecting the behavior as corresponding to a denied behavior for a defined capability.

2. The method of claim 1, wherein defining the capabilities comprises defining the capabilities according to hierarchical relationships, wherein the hierarchical relationships define associations between the cloud native VM, the one or more services running on the cloud native VM, the defined capabilities of the one or more services, and behaviors allowed and denied by the defined capabilities.

3. The method of claim 1, wherein the defined capabilities comprise one or more behavioral rules that define at least one of allowed and denied behaviors for the one or more services.

4. The method of claim 1, wherein the plurality of discrete behaviors includes at least one of running a process, using an input argument for a process, and accessing a file path.

5. The method of claim 1, wherein creating the normal behavior model further comprises, correlating behaviors among the plurality of discrete behaviors for the one or more services with respect to at least one of a parameter used for a process executed as part of the plurality of discrete behaviors, a socket used as part of the plurality of discrete behaviors, and a type of file created as part of the plurality of discrete behaviors; and indicating correlated discrete behaviors in capabilities for corresponding ones of the one or more services.

6. The method of claim 1, further comprising uploading the normal behavior model to a cloud service, wherein the normal behavior model is accessible to installations accessing the cloud service when uploaded to the cloud service.

7. The method of claim 6, further comprising enhancing defined capabilities of the normal behavior model with behavioral rules indicating allowed and denied behaviors at runtime execution of the normal behavior model by the installations accessing the cloud service.

8. A non-transitory machine-readable medium having program code stored thereon, the program code comprising instructions to:

train a machine learning model to detect normal behavior of one or more services running on a cloud native virtual machine (VM), wherein the machine learning model is trained to detect normal behavior on training data comprising a plurality of discrete behaviors of the one or more services and indications of whether each of the plurality of discrete behaviors corresponds to normal or abnormal behavior;

generate a normal behavior model according to defined capabilities for the one or more services and the trained machine learning model, wherein the defined capabilities indicate at least one of allowed behaviors and denied behaviors for each of the one or more services, further wherein defined capabilities are defined based, at least in part, behaviors for the one or more services that the machine learning model has detected as normal or abnormal; and detect a behavior that deviates from the normal behavior model, wherein the program code to detect a behavior that deviates from the normal behavior model comprises instructions to at least one of, detect the behavior as an abnormal behavior with the trained machine learning model, detect the behavior as not corresponding to an allowed behavior for a defined capability, and detect the behavior as corresponding to a denied behavior for a defined capability.

9. The non-transitory machine-readable medium of claim 8, wherein the program code to define the capabilities comprises instructions to define the capabilities according to hierarchical relationships, wherein the hierarchical relationships define associations between the cloud native VM, the one or more services running on the cloud native VM, the defined capabilities of the one or more services, and behaviors allowed and denied by the defined capabilities.

10. The non-transitory machine-readable medium of claim 8, wherein the defined capabilities comprise one or more behavioral rules that define at least one of allowed and denied behaviors for the one or more services.

11. The non-transitory machine-readable medium of claim 8, wherein the plurality of discrete behaviors includes at least one of running a process, using an input argument for a process, and accessing a file path.

12. The non-transitory machine-readable medium of claim 8, wherein the program code to create the normal behavior model further comprises instructions to:

correlate behaviors among the plurality of discrete behaviors for the one or more services with respect to at least one of a parameter used for a process executed as part of the plurality of discrete behaviors, a socket used as part of the plurality of discrete behaviors, and a type of file created as part of the plurality of discrete behaviors; and indicate correlated discrete behaviors in capabilities for corresponding ones of the one or more services.

13. The non-transitory machine-readable medium of claim 8, wherein the program code further comprises instructions to upload the normal behavior model to a cloud service, wherein the normal behavior model is accessible to installations accessing the cloud service when uploaded to the cloud service.

14. The non-transitory machine-readable medium of claim 13, wherein the program code further comprises instructions to enhance defined capabilities of the normal behavior model with behavioral rules indicating allowed and denied behaviors at runtime execution of the normal behavior model by the installations accessing the cloud service.

15. An apparatus comprising:

a processor; and a machine-readable medium having instructions stored thereon that are executable by the processor to cause the apparatus to, train a machine learning model to detect normal behavior of one or more services running on a cloud native virtual machine (VM), wherein the machine learning model is trained to detect normal behavior on training data comprising a plurality of discrete behaviors of the one or more services and indications of whether each of the plurality of discrete behaviors corresponds to normal or abnormal behavior;

generate a normal behavior model according to defined capabilities for the one or more services and the trained machine learning model, wherein the defined capabilities indicate at least one of allowed behaviors and denied behaviors for each of the one or more services, further wherein defined capabilities are defined based, at least in part, behaviors for the one or more services that the machine learning model has detected as normal or abnormal; and detect a behavior that deviates from the normal behavior model, wherein the instructions to detect a behavior that deviates from the normal behavior model comprise instructions executable by the processor to cause the apparatus to at least one of, detect the behavior as an abnormal behavior by the trained machine learning model, detect the behavior as not corresponding to an allowed behavior for a defined capability, and detect the behavior as corresponding to a denied behavior for a defined capability.

16. The apparatus of claim 15, wherein the instructions to define the capabilities comprise instructions executable by the processor to cause the apparatus to define the capabilities according to hierarchical relationships, wherein the hierarchical relationships define associations between the cloud native VM, the one or more services running on the cloud native VM, the defined capabilities of the one or more services, and behaviors allowed and denied by the defined capabilities.

17. The apparatus of claim 15, wherein the defined capabilities comprise one or more behavioral rules that define at least one of allowed and denied behaviors for the one or more services.

18. The apparatus of claim 15, wherein the plurality of discrete behaviors includes at least one of running a process, using an input argument for a process, and accessing a file path.

19. The apparatus of claim 15, wherein the instructions to create the normal behavior model further comprise instructions executable by the processor to cause the apparatus to:

correlate behaviors among the plurality of discrete behaviors for the one or more services with respect to at least one of a parameter used for a process executed as part of the plurality of discrete behaviors, a socket used as part of the plurality of discrete behaviors, and a type of file created as part of the plurality of discrete behaviors; and indicate correlated discrete behaviors in capabilities for corresponding ones of the one or more services.

20. The apparatus of claim 15, further comprising instructions executable by the processor to cause the apparatus to upload the normal behavior model to a cloud service, wherein the normal behavior model is accessible to installations accessing the cloud service when uploaded to the cloud service.

* * * * *